United States Patent
Kong (10) Patent No.: US 11,303,433 B2
(45) Date of Patent: Apr. 12, 2022

(54) METHOD AND DEVICE FOR GENERATING HD WALLET NAME CARD AND METHOD AND DEVICE FOR GENERATING HD WALLET TRUSTED ADDRESS

(71) Applicant: Shanghai Ekool Information Technology Service Co., Ltd., Shanghai (CN)

(72) Inventor: Yanbin Kong, Shanghai (CN)

(73) Assignee: Yanbin Kong, Shanghai (CN)

( * ) Notice: Subject to any disclaimer, the term of this patent is extended or adjusted under 35 U.S.C. 154(b) by 516 days.

(21) Appl. No.: 16/408,032

(22) Filed: May 9, 2019

(65) Prior Publication Data
US 2020/0235920 A1    Jul. 23, 2020

(30) Foreign Application Priority Data
Jan. 22, 2019    (CN) .......................... 201910059728.4

(51) Int. Cl.
*H04L 9/08* (2006.01)
*G06Q 20/36* (2012.01)
*H04L 9/32* (2006.01)

(52) U.S. Cl.
CPC .......... *H04L 9/0825* (2013.01); *G06Q 20/36* (2013.01); *H04L 9/3247* (2013.01); *H04L 9/3265* (2013.01); *H04L 2209/56* (2013.01)

(58) Field of Classification Search
CPC ... H04L 9/0825; H04L 9/3247; H04L 9/3265; H04L 2209/56; H04L 9/0836; H04L 9/0869; H04L 2209/38; H04L 9/3239; H04L 9/3231; G06Q 20/36; G06Q 2220/00; G06Q 20/02; G06Q 20/3829
See application file for complete search history.

(56) References Cited

U.S. PATENT DOCUMENTS

| | | | |
|---|---|---|---|
| 6,263,446 B1 * | 7/2001 | Kausik | G06F 21/6245 380/259 |
| 6,694,025 B1 * | 2/2004 | Epstein | H04L 9/0894 380/279 |
| 9,935,772 B1 * | 4/2018 | Madisetti | H04L 9/0819 |
| 9,985,964 B2 * | 5/2018 | Andrade | H04L 63/08 |
| 10,102,526 B1 * | 10/2018 | Madisetti | G06Q 20/065 |
| 10,262,321 B1 * | 4/2019 | Ramanathan | G06Q 20/3829 |

(Continued)

*Primary Examiner* — Fatoumata Traore
*Assistant Examiner* — Mirza Israr Javed
(74) *Attorney, Agent, or Firm* — Schwegman Lundberg & Woessner, P.A.

(57) ABSTRACT

The present invention provides a method and a device for generating an HD wallet name card and a method and a device for generating an HD wallet trusted address. The method for generating the HD wallet name card comprises: first signature information is obtained by digitally signing first user information with a first private key; second signature information is obtained by digitally signing second user information with a first trusted private key; and the first user information, the second user information, the first signature information and the second signature information are integrated to generate the HD wallet name card. The present invention is advantageous in that the wallet information is digitally signed with the preset first trusted private key and the first private key, thus preventing the HD wallet name card from being forged, intercepted, and modified by a third party so as to ensure the security of transaction.

19 Claims, 8 Drawing Sheets

```
┌─────────────────────────────────────────────────┐
│ digitally signing first user information with  │   S1
│ a first private key to obtain first signature  │
│ information                                     │
└─────────────────────────────────────────────────┘
                        │
                        ▼
┌─────────────────────────────────────────────────┐
│ digitally signing second user information with │   S2
│ a first trusted private key to obtain second   │
│ signature information                           │
└─────────────────────────────────────────────────┘
                        │
                        ▼
┌─────────────────────────────────────────────────┐
│ generating an HD wallet name card by           │   S3
│ integrating the first user information, the    │
│ second user information, the first signature   │
│ information, and the second signature          │
│ information                                     │
└─────────────────────────────────────────────────┘
```

(56) References Cited

U.S. PATENT DOCUMENTS

| | | | |
|---|---|---|---|
| 2006/0242423 A1* | 10/2006 | Kussmaul | H04L 9/3231 |
| | | | 713/182 |
| 2009/0183008 A1* | 7/2009 | Jobmann | G06F 21/34 |
| | | | 713/186 |
| 2015/0310431 A1* | 10/2015 | Lakshmanan | G06Q 20/3226 |
| | | | 705/71 |
| 2015/0324789 A1* | 11/2015 | Dvorak | H04W 12/06 |
| | | | 705/67 |
| 2017/0046689 A1* | 2/2017 | Lohe | G06Q 20/40 |
| 2017/0228731 A1* | 8/2017 | Sheng | G06Q 20/401 |
| 2017/0317997 A1* | 11/2017 | Smith | G06Q 20/02 |
| 2018/0075453 A1* | 3/2018 | Durvasula | G06Q 20/389 |
| 2018/0288022 A1* | 10/2018 | Madisetti | H04L 9/3297 |
| 2019/0295069 A1* | 9/2019 | Pala | G06Q 20/3829 |

* cited by examiner

METHOD AND DEVICE FOR GENERATING HD WALLET NAME CARD AND METHOD AND DEVICE FOR GENERATING HD WALLET TRUSTED ADDRESS

CROSS REFERENCE TO RELATED APPLICATIONS

This application claims the benefit of CN 201910059728.4, filed on Jan. 22, 2019, the disclosure of which is incorporated herein by reference in its entirety.

TECHNICAL FIELD

The present invention relates to a method and a device for generating an HD wallet name card and a method and a device for generating an HD wallet trusted address.

BACKGROUND

With the increasing influence of digital encryption economics, people need to manage multiple private keys. In order to manage a large number of private keys, people use a single private seed to derive and manage a large number of private keys. For example, a digital-currency hierarchical deterministic (HD) wallet uses different key pairs of different currencies which are derived from a single seed according to BIP32 and generates coin addresses from key pairs. A large number of addresses will be created and used for different currencies or even the same currency in single HD wallet. Such a method can improve user privacy, but it also brings security risks to both parties. Hackers and fraudsters can falsify and tamper the transaction address during the transmission of a transaction request. However, a sender and the sender's wallet software/hardware cannot identify the forgery and tampering and sign the transaction, resulting in loss of both parties.

SUMMARY

To solve the deficiencies of the prior art, the present invention provides a method and a device for generating an HD wallet name card and a method and a device for generating an HD wallet trusted address.

In order to achieve the above objectives, the present invention adopts the following technical solutions.

A method for generating an HD wallet name card, which is applied to a HD wallet device, wherein the HD wallet device has a preset first trusted key and a first key generated by the seed; the first trusted key comprises a first trusted private key and a first trusted public key; the first key comprises a first private key, a first public key and a first address; and the method for generating the HD wallet name card comprises the following steps: digitally signing first user information with the first private key to obtain first signature information; digitally signing second user information with the first trusted private key to obtain second signature information; and generating the HD wallet name card by integrating the first user information, the second user information, the first signature information, and the second signature information.

Further, a specific step of digitally signing the first user information with the first private key to obtain the first signature information may be: digitally signing a wallet name card, first user data and the first public key with the first private key to obtain the first signature information.

Further, a specific step of digitally signing the first user information with the first private key to obtain the first signature information may be: digitally signing a wallet name card, first user data, the first public key and the first address with the first private key to obtain the first signature information.

Further, a specific step of digitally signing the first user information with the first private key to obtain the first signature information may be: digitally signing a wallet name, first user data, the first public key, the first address, and the second signature information with the first trusted key to obtain the first signature information.

Further, a specific step of digitally signing the second user information with the first trusted private key to obtain the second signature information may be: digitally signing a wallet name, first user data, and the first public key with the first trusted private key to obtain the second signature information.

Further, a specific step of digitally signing the second user information with the first trusted private key to obtain the second signature information may be: digitally signing a wallet name, first user data, the first public key and the first address with the first trusted private key to obtain the second signature information.

Further, a specific step of digitally signing the second user information with the first trusted private key to obtain the second signature information may be: digitally signing a wallet name, first user data, the first public key, the first address and the first signature information with the first trusted private key to obtain the second signature information.

Further, the first user data may comprise: a wallet cover for visually displaying information of the HD wallet name card; and biological data for representing the user's biological information.

Further, the HD wallet device may further have a preset second trusted key, and the second trusted key may comprise a second trusted private key; and the wallet cover may be generated through the following steps: generating a name image comprising the wallet name with the wallet name; generating a first short code ID with the first address and the second trusted private key; generating a second short code ID with the wallet name, the first address, and the second trusted private key; and generating the wallet cover by integrating the name image, the second short code ID, and the first short code ID.

Further, the HD wallet device may have a third key generated by the seed, the third key comprises a third private key, a third public key, and a third address; and the method for generating the HD wallet name card may further comprise: creating a trusted peer HD wallet name card on a peer HD wallet name card from a peer seed; digitally signing a peer HD wallet name card after verifying the peer HD wallet name card with the third private key to obtain peer wallet name card trust signature; and integrating the peer HD wallet name card and the peer wallet name card trust signature to create the trusted peer HD wallet name card.

An HD wallet device, comprising: a first key and a preset first trusted key; wherein the first key comprises a first private key, a first public key, and a first address; the first trusted key comprises a first trusted private key and a first trusted public key; and an HD wallet generating device comprises: a digital signature module, configured to digitally sign first user information with the first private key to obtain first signature information and to digitally sign second user information with the first trusted private key to obtain second signature information; and a name card generating module, configured to generate an HD wallet name card by integrating the first user information, the second user information, the first signature information, and the second signature information.

A method for generating an HD wallet trusted address, which is applied to an HD wallet device, wherein the HD wallet device comprises a first key, a second key and a preset first trusted key; the first key comprises a first private key, a first public key, and a first address; the second key comprises a second private key, a second public key and a second address; the first trusted key comprises a first trusted private key and a first trusted public key; and the method for generating the HD wallet trusted address comprises the following steps: digitally signing third user information with the first private key to obtain third signature information; digitally signing fourth user information with the first trusted private key to obtain fourth signature information; and generating the HD wallet trusted address by integrating the third user information, the fourth user information, the third signature information, and the fourth signature information.

Further, the method for generating the HD wallet trusted address may further comprise digitally signing fifth user information with the second private key to obtain fifth signature information; and generating the HD wallet trusted address by integrating the third user information, the fourth user information, the fifth user information, the third signature information, the fourth signature information, and the fifth signature information.

Further, a specific step of digitally signing the third user information with the first private key to obtain the third signature information may be: digitally signing the first public key and the second address with the first private key to obtain the third signature information.

Further, a specific step of digitally signing the third user information with the first private key to obtain the third signature information may be: digitally signing the first public key, the first address and the second address with the first private key to obtain the third signature information.

Further, a specific step of digitally signing the third user information with the first private key to obtain the third signature information may be: digitally signing the first public key, the first address, the second address and second user data with the first private key to obtain the third signature information.

Further, a specific step of digitally signing the third user information with the first private key to obtain the third signature information may be: digitally signing the first public key, the first address, the second address, second user data and the fourth signature information with the first trusted private key to obtain the third signature information.

Further, a specific step of digitally signing the fourth user information with the first trusted private key to obtain the fourth signature information may be: digitally signing the first public key and the second address with the first trusted private key to obtain the fourth signature information.

Further, a specific step of digitally signing the fourth user information with the first trusted private key to obtain the fourth signature information may be: digitally signing the first public key, the first address and the second address with the first trusted private key to obtain the fourth signature information.

Further, a specific step of digitally signing the fourth user information with the first trusted private key to obtain the fourth signature information may be: digitally signing the first public key, the first address, the second address and second user data with the first trusted private key to obtain the fourth signature information.

Further, a specific step of digitally signing the fourth user information with the first trusted private key to obtain the fourth signature information may be: digitally signing the first public key, the first address, the second address, second user data and the third signature information with the first trusted private key to obtain the fourth signature information.

Further, all the HD wallet trusted addresses generated from a seed may have integral and consistent belonging connection to the HD wallet name card of the seed as mentioned above; the HD wallet trusted address is verified with the first trusted public key and the first public key to prove the address generated from the seed with the first address, and the HD wallet trusted address is integral and consistent; the HD wallet name card is verified with the first trusted public key and the first public key to prove the HD wallet name card from the seed with the first address and the HD wallet name card is integral and consistent; and the HD wallet trusted address belongs to the HD wallet name card with the same first address, the belonging connection is integral and consistent then.

An operating method, comprising the following steps: generating an HD wallet name card through an HD wallet device and sending the HD wallet name card to a receiver by a sender; and verifying the HD wallet name card by the receiver.

Further, the operating method may further comprise: generating an HD wallet trusted address through the HD wallet device and sending the HD wallet trusted address to the receiver by the sender; and verifying the HD wallet trusted address with the HD wallet name card by the receiver.

An operating method, comprising the following steps: generating an HD wallet name card through an HD wallet device and sending the HD wallet name card to a receiver by a sender; and trusting the HD wallet name card after verifying the HD wallet name card by the receiver.

Further, the operating method may further comprise: generating an HD wallet trusted address through the HD wallet device and sending the HD wallet trusted address to the receiver by the sender; and trusting the HD wallet trusted address after verifying the HD wallet trusted address with the HD wallet name card by the receiver.

The present invention is advantageous in that according to the provided method for generating the HD wallet name card, the user information is digitally signed with the preset first trusted private key and the first private key, thus preventing the HD wallet name card from being forged, intercepted, and modified by a third party so as to ensure the security of transaction.

The cover of the HD wallet name card has a fairly anti-counterfeiting capability. The wallet name, the first short code ID, and even the second short code ID on the cover have considerable collision difficulty, and can be used to distinguish different wallets in the same way as the "bank+card number" on a bank card does, so that it is convenient for people to identify different wallet cards in a more intuitive way.

The first public key, the second address and other information are digitally signed with the preset first trusted private key and the first public key to generate a trusted address, so as to prove that the second address belongs to the HD wallet name card corresponding to the first public key. This proof can be prevented from being forged, intercepted, and modified by a third party. Based on the proof, the trust of the HD wallet name card can be transferred to the trust of the trusted address so that the transaction can be initiated securely to the second address.

By signing the received third party HD wallet name card with the trusted private key of the own wallet, the trusted relationship can be digitized so that the trusted address from the wallet name card can be better trusted in subsequent transactions.

DETAILED DESCRIPTION OF THE EMBODIMENTS

The present invention is further detailed in combination with the drawings and embodiments as follows.

The present invention discloses a method for generating an HD wallet name card, which is applied to an HD wallet device. The HD wallet device has a preset first trusted key, wherein the first trusted key comprises a first trusted private key and a first trusted public key, and the preset first trusted keys are the same for different HD wallet devices. Meanwhile, the HD wallet device further has a first key generated by a seed of the HD wallet according to a preset designated path. The seed of the HD wallet is randomly generated by a user through the HD wallet device, and the private key, the public key, and the address under different cryptocurrencies are derived from the randomly generated seed according to the BIP32 and BIP44b standards, wherein the first key is generated by the HD wallet device according to a preset designated path; the first key comprises a first private key, a first public key, and a first address, and is specifically used for signing the HD wallet name card and the HD wallet trusted address. The first address of the first key is used as an identity identifier for different wallets of users.

In the present invention, the HD wallet device may be an independent security hardware product, such as an HD wallet hardware device, produced by a wallet hardware manufacturer, or other electronic devices which can implement the functions described in the present invention, such as a mobile phone or a tablet computer.

Figure 1:
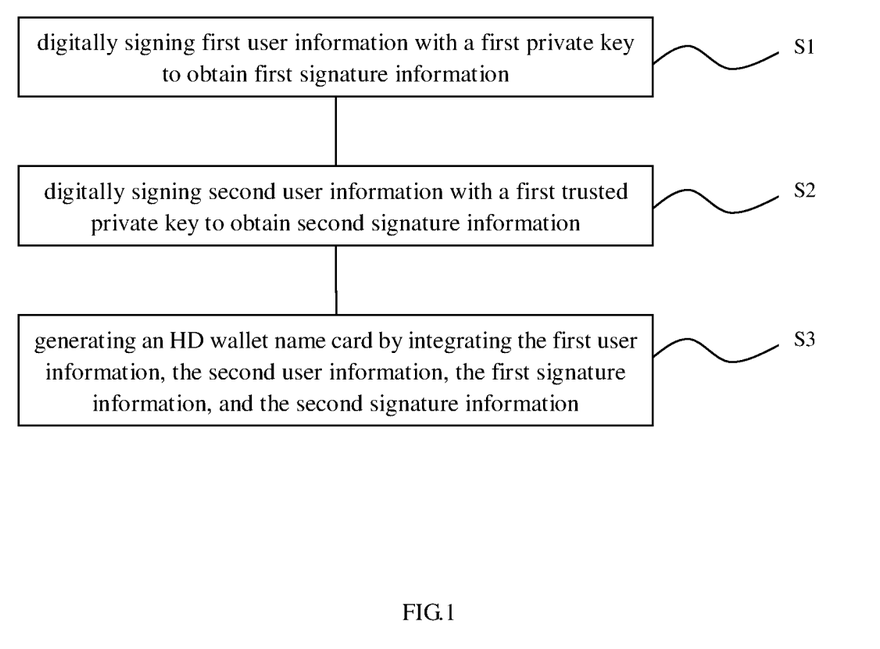
FIG. 1 is a schematic diagram of a method for generating an HD wallet name card according to the present invention.

FIG. 1 shows the specific steps of a method for generating an HD wallet name card according to the present invention. Step S1: the first signature information is obtained by digitally signing the first user information with the first private key; Step S2: the second signature information is obtained by digitally signing the second user information with the first trusted private key; Step S3: the first user information, the second user information, the first signature information, and the second signature information are integrated to generate an HD wallet name card; wherein Step S1 and Step S21 can be changed in order to achieve the same effect.

In Step S1, the first signature information is obtained by digitally signing the first user information with the first private key.

Specifically, firstly, the first signature information is obtained by digitally signing the first user information of a user with the first private key of the first key generated by the designated path, wherein the first user information of a user specifically comprises a wallet name, the first user data, the first public key, and the first address. It shall be understood that the wallet name and the first user data in the first user information can be set in advance by a user.

It shall be understood that under the premise of a known derivation algorithm, the corresponding first address can be uniquely derived from the first public key; therefore, as an optional manner, the first user information may only comprise a wallet name and the first user data and the first public key.

The optional Step S1 can be performed as the second step, and the second signature information can also be added to the first user information for signing the first user information.

In Step S2, the second signature information is obtained by digitally signing the second user information with the first trusted private key.

Specifically, the second signature information is obtained by digitally signing the second user information of a user with the first trusted private key of the preset first trusted key, wherein the second user information of a user specifically comprises a wallet name, the first user data, the first public key and the first address. It shall be understood that the wallet name and the first user data in the second user information can be set in advance by a user.

Similar to Step S1, under the premise of a known derivation algorithm, the corresponding first address can be uniquely derived from the first public key; therefore, as an optional implementation manner, the second user information may only comprise a wallet name and the first user data and the first public key.

As another optional implementation manner, the first signature information may also be added to the second user information for digitally signing the second user information.

In Step S3, the first user information, the second user information, the first signature information and the second signature information are integrated to generate an HD wallet name card.

Specifically, after the first signature information and the second signature information are obtained, the first user information, the second user information, the first signature information, and the second signature information are integrated to generate an HD wallet name card.

Specifically, the instruction for generating an HD wallet name card is sent to the HD wallet device by a host computer, and the HD wallet device performs the above operations according to the received instruction to generate an HD wallet name card and then sends the HD wallet name card through the HD wallet device to the host computer for propagation. It shall be understood that the host computer can save the HD wallet name card for reuse after receiving the HD wallet name card.

The wallet name and the first user data are generally set by a user to identify the related information of the user, wherein the wallet name is generally set as a user name, and optionally, a user can also set the wallet name according to specific needs, such as a company name and an organization name and the like. The first user data may comprise the following information: a visual wallet cover, biometric data and others.

For the wallet cover, it shall be understood that the wallet cover is a supplement to the first address, and the identification which is more easily recognized by a user is convenient for the user to operate, such as for the user to exchange, view, save, and trust. The wallet cover is generated when the HD wallet device generates the HD wallet name card, being composed of three parts: a wallet name, a first short code ID, and a second short code ID.

Figure 2:
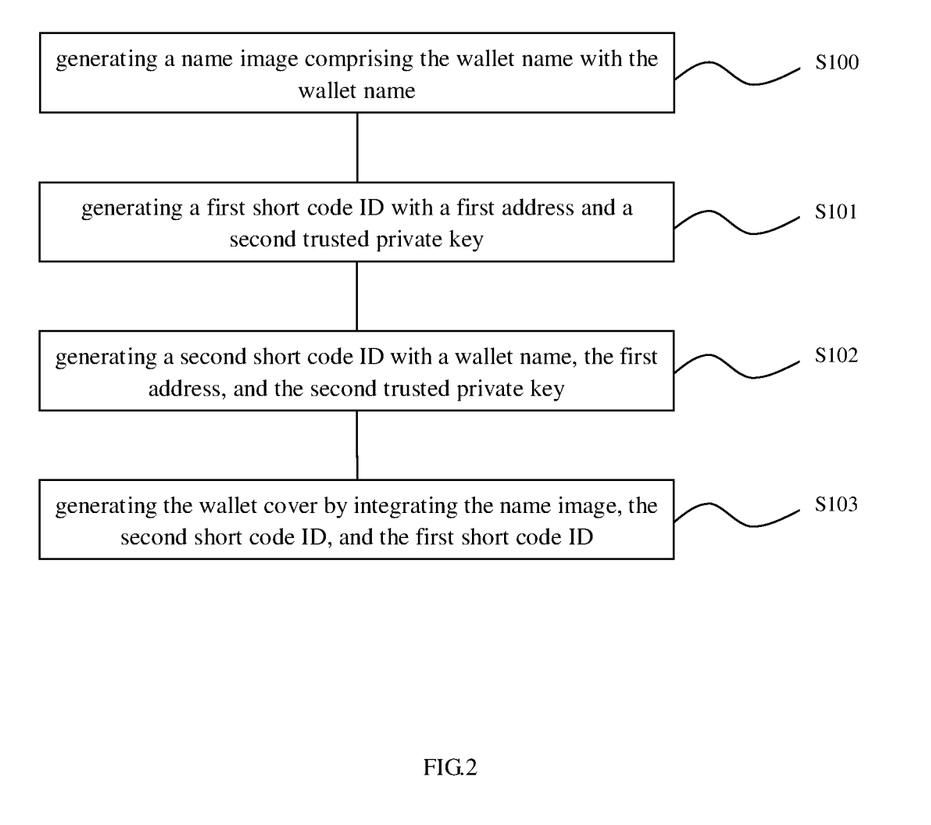
FIG. 2 is a schematic diagram of a method for generating a wallet cover according to the present invention.

Specifically, the HD wallet device further has a preset second trusted key which has a corresponding second trusted private key specifically used by the HD wallet device to generate a wallet cover. As shown in FIG. 2, the specific steps of generating a wallet cover are as follows: Step S100: generating a name image comprising the wallet name with the wallet name; Step S101: a first short code ID is generated with the first address and the second trusted private key; Step S102: a second short code ID is generated with the wallet name, the first address and the second trusted private key; Step S103: the wallet name card, the second short code ID and the first short code ID are integrated to generate a wallet cover.

In Step S101, a first short code ID is generated with the first address and the second trusted private key.

A first short code ID is generated with the first address and the second trusted private key according to a certain algorithm, wherein the generating process is an algorithm with a hashing feature, and the hashing algorithm is mapped to a small space. For example, the first address is converted to an 8-digit number code. In the case that the second algorithm key is kept secret, to obtain the same first short code ID, the third party can only randomly generate the wallet seed on the HD wallet device to collide, and the speed of generating the HD wallet seed provided by the corresponding HD wallet device is limited and requires manual operation, making the collision behavior infeasible.

In Step S102, a second short code ID is generated with the wallet name, the first address, and the second trusted private key;

The second short code ID is generated with the wallet name, the first address, and the second trusted private key according to a certain algorithm, wherein the generating process is an algorithm with a hashing feature, and the hashing algorithm is mapped to a small space. For example, the first address is converted to a 4-digit letter code. In the case that the second algorithm key is kept secret, to obtain the same second short code ID, the third party can only generate the HD wallet name card using different wallet names or randomly generate the wallet seed on the HD wallet device to collide, and the speed of generating the HD wallet name card or generating HD wallet seeds provided by the corresponding HD wallet device is limited and requires a manual operation, making the collision behavior infeasible.

The first short code ID and the second short code ID are combined into a wallet short code ID. In the above example, specifically, the first address for distinguishing the identity of different users is too long, and the readability and the memorability are weak. The wallet name is familiar to the user and the short code is simpler, which are convenient for the user to remember, recognize and operate. Taking the above embodiment as an example, the short code ID of 4-digit letters+8-digit numbers plus a wallet name are similar to bank cards.

The wallet name, the first short code ID and the second short code ID are simultaneously protected by the signatures of the first private key and the first trusted private key. It shall be understood that the wallet name, the first short code ID, and the second short code ID must be generated by the owner of the wallet using the HD wallet device. For a person attempting to simultaneously generate a wallet name card with the same short code ID and wallet name for deception and other purposes, he/she must generate a seed which will generate the same first short code ID and the same second short code ID with the same wallet name with the HD wallet device.

One of the methods is to obtain the same random seed through a random collision, and then obtain the same first private key, the first public key, and the first address; in the case that randomness of the random number to generate the target seed is guaranteed, the probability is extremely small; another method is to continuously generate different random seeds until the same first short code ID seed is obtained. Taking the first short code ID of 8-digit numbers as an example, when the length of the random seed is 256 bits, the hashing algorithm can ensure that the same short code ID can be obtained by an average of $2^{256}/10^8$, namely, $10^{69}$ collisions. Because of the existence of the second trusted key, the process must be done on the wallet hardware. It takes a considerable amount of time (including a backup seed) to complete the process of generating a new seed on the wallet hardware, such as 5 minutes, combined with the number of collisions of the seed generating the given first short code ID, which is an impossible task.

Since the short code space is only $10^8$, it is obviously not excluded that the first short code ID of a wallet seed of a certain user is exactly the same as the first short code ID of a wallet seed of the other user; in this case, because of the difference of the random seeds the two users, the corresponding first private key, the first public key and the first address are also different; because of the feature of the hashing algorithm, in the case that the wallet names of the two users are the same, it is obvious that the second short code ID is different. Thus, the short code ID and wallet name of these two users will not be the same.

Based on the above characteristics, the wallet name and the short code ID still have extremely low probability of being equal to each other while ensuring easy memory and recognition, and are highly resistant to malicious collisions. It is certain that the wallet name+the short code ID can be used in the same way as the first address which distinguishes the identity of different users, and has better recognizability and memorability for users.

In Step S103, the wallet name card, the first short code ID, and the second short code ID are integrated to generate a wallet cover.

Specifically, according to a set format, the wallet name, the first short code ID and the second short code ID generate a picture to be used as a wallet cover. The wallet cover, the first short code ID, the second short code ID, and the wallet name are used together as a part of the first user information and the second user information, and the first private key and the first trusted private key are respectively used for a signature, ensuring that the first short code ID, the second short code ID, the wallet name, and the wallet cover are protected as a whole.

Alternatively, the background pattern of the wallet cover may be generated by a host computer, and a user may add the user's own features in the pattern.

Figure 3:
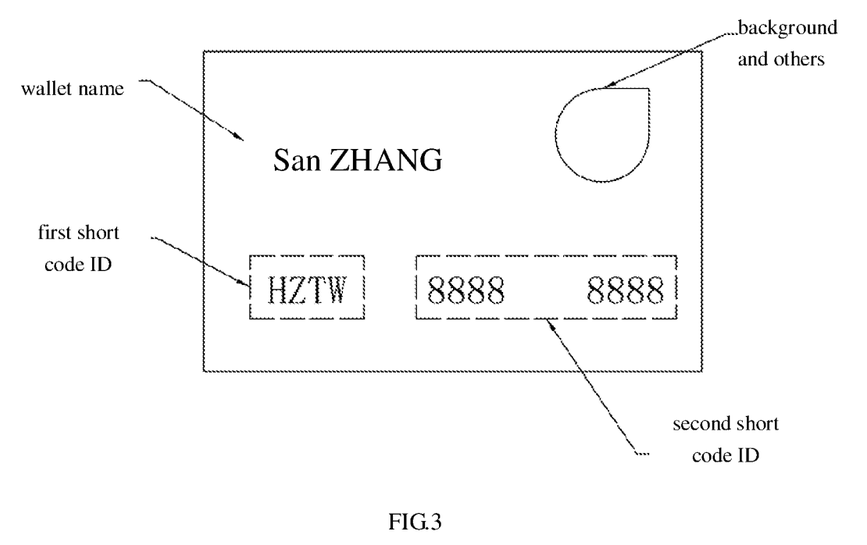
FIG. 3 is a schematic diagram of a wallet cover according to the present invention.

FIG. 3 is a schematic diagram of a specific wallet cover according to the present invention, wherein the wallet name part is formatted by the wallet name information of the wallet, and the first short code ID part is formatted by the first short code ID, the second short code ID part is formatted by the second short code ID, and the background pattern and others may be provided by the user or the system. This schematic diagram is for reference only. The specific mode, position, and size of the implemented format can be varied.

Alternatively, the biological data is specifically a user's biological information, such as sound, fingerprint, 3D shape and iris, used for indicating the user's authorization operation on the HD wallet name card, so that the HD wallet name card has corresponding user identification information, increasing the credibility thereof.

Optionally, the first user data further comprise the following information: supplementary information.

Specifically, the supplementary information may be a supplementary text description or blockchain data.

Figure 4:
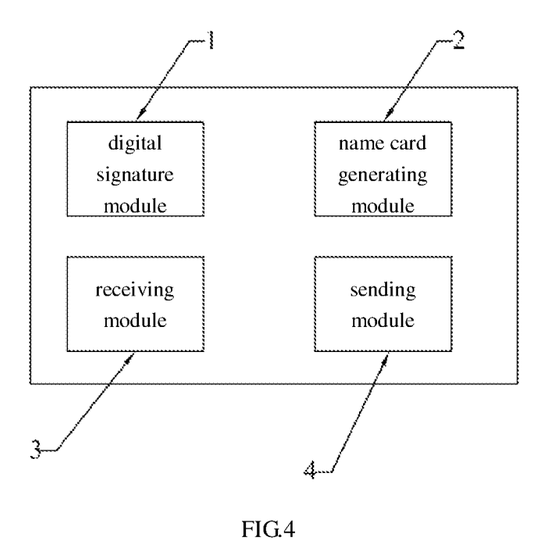
FIG. 4 is a schematic diagram of an HD wallet device according to the present invention.

As shown in FIG. 4, the HD wallet device in the present invention specifically comprises a digital signature module 1 and a name card generating module 2.

Specifically, a digital signature module 1 digitally signs the first user information with the first private key to obtain the first signature information and digitally signs the second user information with the first trusted private key to obtain the second signature information; a name card generating module 2 generates the HD wallet name card by integrating the first user information, the second user information, the first signature information, and the second signature information.

Further, the HD wallet device in the present invention further comprises a receiving module 3 and a transmitting module 4. The receiving module 3 is used for receiving an operating instruction sent by the host computer, and the sending module 4 is used for sending the generated HD wallet name card to the host computer.

The present invention further discloses a method for generating an HD wallet trusted address, which is applied to an HD wallet device.

Based on the above description, the HD wallet device further has a second key which comprises a second private key, a second public key and a second address.

Specifically, the second key is a key of a specific digital currency.

Figure 5:
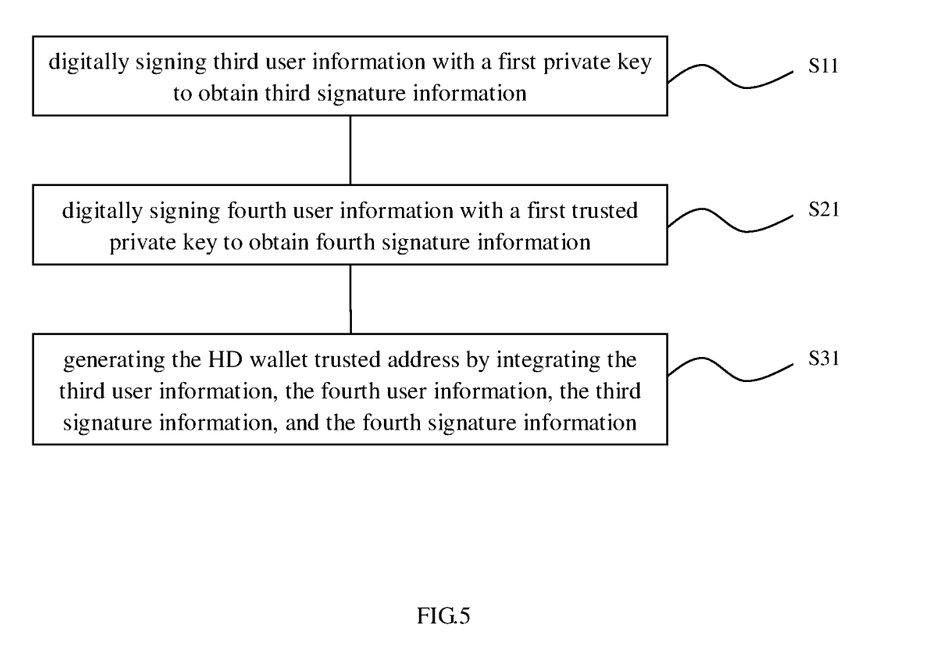
FIG. 5 is a schematic diagram of generating an HD wallet trusted address according to the present invention.

FIG. 5 shows the specific steps of a method for generating an HD wallet trusted address according to the present invention. Step S11: the third signature information is obtained by digitally signing the third user information with the first private key; Step S21: the fourth signature information is obtained by digitally signing the fourth user information with the first trusted private key; Step S31: the third user information, the fourth user information, the third signature information, and the fourth signature information are integrated to generate an HD wallet trusted address; wherein Step S11 and Step S21 can be changed in order to achieve the same effect.

In Step S11, the third signature information is obtained by digitally signing the third user information with the first private key.

Specifically, firstly, the third signature information is obtained by digitally signing the third user information of a user with the first private key of the first key generated by the designated path, wherein the third user information of the user specifically comprises the first public key, the first address, and the second address.

It shall be understood that under the premise of a known derivation algorithm, the corresponding first address can be uniquely derived from the first public key; therefore, as an optional manner, the third user information may only comprise the first public key and the second address.

As an optional implementation manner, the third user information may further comprise the second user data.

The second user data may comprise the information of the current service request, and the service information comprises a transfer request and a timestamp information of the request.

As an optional implementation manner, the third user information may further comprise the fourth signature information.

In Step S21, the fourth signature information is obtained by digitally signing the fourth user information with the first trusted private key.

Specifically, the fourth signature information is obtained by digitally signing the fourth user information of a user with the first trusted private key of the preset first trusted key, wherein the fourth user information of a user specifically comprises the first public key, the first address, and the second address.

Similar to Step S1, under the premise of a known derivation algorithm, the corresponding first address can be uniquely derived from the first public key; therefore, as an optional implementation manner, the fourth user information may only comprise the first public key and the second address.

As an optional implementation manner, the fourth user information may further comprise the second user data, wherein the fourth user information may comprise the information of the current service request, and the service information comprises a transfer request and a timestamp information of the request.

Further, the fourth user information may further comprise the third signature information.

Figure 9:
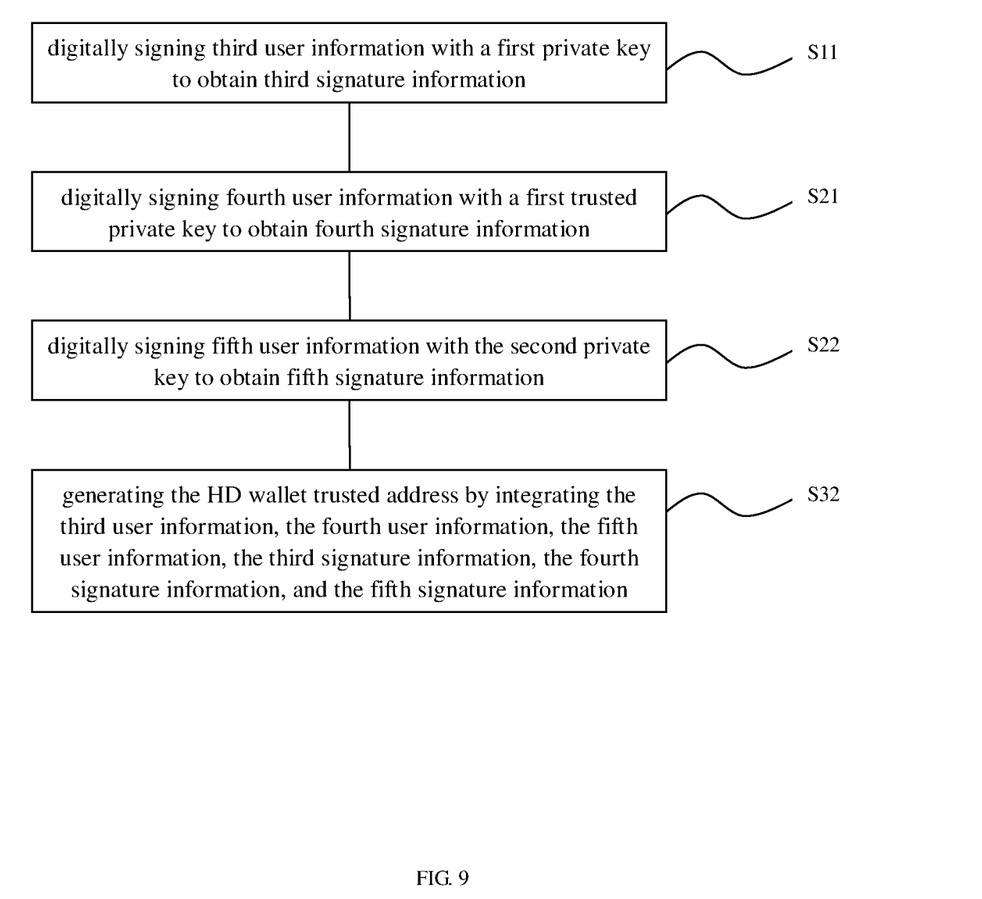
FIG. 9 is a schematic diagram of generating an HD wallet trusted address according to one embodiment of the present invention.

Optionally, one embodiment of a method for generating the HD wallet trusted address further includes Step S22, as shown in FIG. 9. In Step S22, the fifth signature information is obtained by digitally signing the fourth user information with the second private key.

Specifically, the fifth signature information is obtained by digitally signing the fifth user information of a user with the second private key of the second key generated from the seed, wherein the fifth user information of a user specifically comprises the first public key, the first address, the second public key and the second address.

Similar to Step S1, under the premise of a known derivation algorithm, the corresponding first address can be uniquely derived from the first public key; therefore, as an optional implementation manner, the fifth user information may only comprise the first public key, the second public key and the second address.

As an optional implementation manner, the fifth user information may further comprise the second user data, wherein the fifth user information may comprise the information of the current service request, and the service information comprises a transfer request and timestamp information of the request. In Step S32, The HD wallet trusted address is generated by integrating the third user information, the fourth user information, the fifth user information, the third signature information, the fourth signature information, and the fifth signature information.

Further, the fifth user information may further comprise the third signature information and the fourth signature information.

In Step S31, the third user information, the fourth user information, the third signature information, and the fourth signature information are integrated to generate an HD wallet trusted address.

Specifically, after the third signature information, the fourth signature information and fifth signature information (if exist) are obtained, the third user information, the fourth user information, the fifth user information (if exist), the third signature information, the fourth signature information, and the fifth signature information (if exist) are integrated to generate an HD wallet trusted address.

The fifth user information and fifth signature information together prove the creator owns the second private key. The HD wallet trusted address integrated with the fifth user information and the fifth signature information further prove the belonging connection between the first address and second address and prove these two addresses are from the same device. Even the one with the first trust key cannot forge belonging connection from a second address, he/she does not own the corresponding second private key with any other first address.

Further, all the HD wallet trusted addresses generated from a seed may have integral and consistent belonging connection to the HD wallet name card of the seed as mentioned above; the HD wallet trusted address is verified with the first trusted public key and the first public key to prove the address generated from the seed with the first address, and the HD wallet trusted address is integral and consistent; the HD wallet name card is verified with the first trusted public key and the first public key to prove the HD wallet name card from the seed with the first address and the HD wallet name card is integral and consistent; and the HD wallet trusted address belongs to the HD wallet name card with the same first address, the belonging connection is integral and consistent then.

Specifically, the instruction for generating an HD wallet trusted address is sent to the HD wallet device by a host computer, and the HD wallet device performs the above operations according to the received instruction to generate a trusted address of the HD wallet and then sends trusted address of the HD wallet through the HD wallet device to the host computer for propagation. The host computer can save the HD wallet trusted address for reuse after receiving the HD wallet trusted address.

Figure 6:
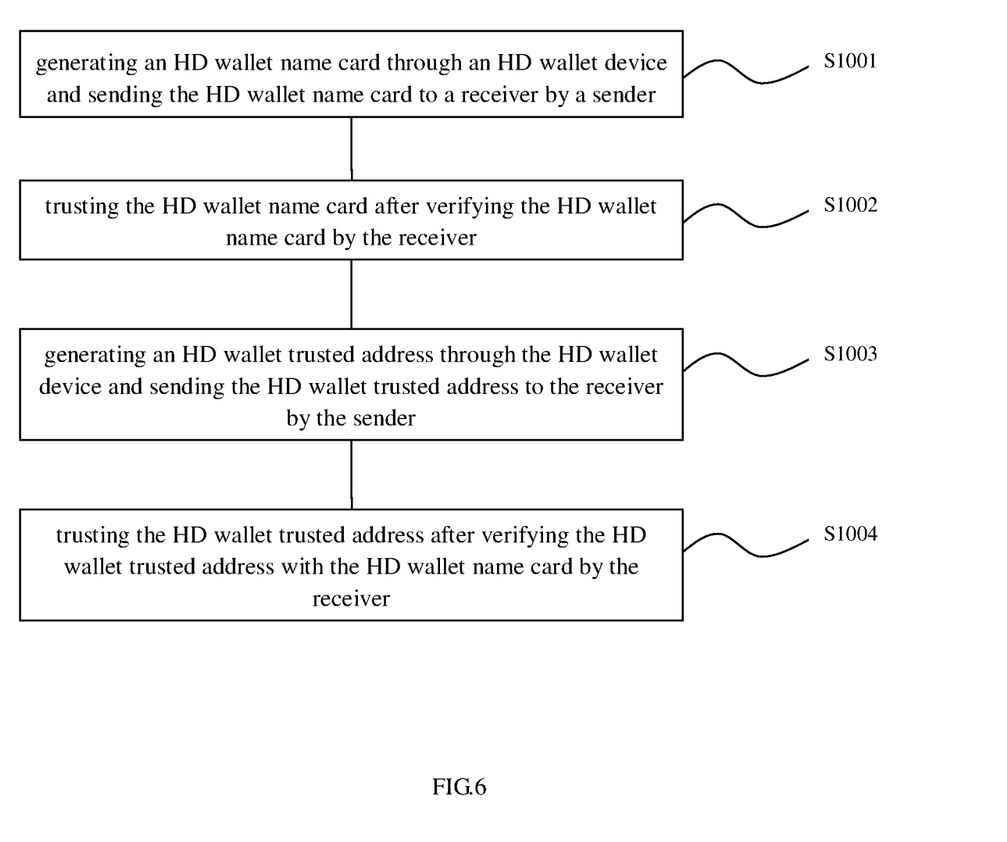
FIG. 6 is a schematic diagram of an operating method according to the present invention.

The detailed process of generating an HD wallet name card and an HD wallet trusted address by a user through the HD wallet device is described above. After a user obtains the HD wallet name card and the HD wallet trusted address through the above method, the HD wallet name and the HD wallet trusted address are sent to the receiver as the identity of the sender. The present invention further discloses an operating method, as shown in FIG. 6, the specific steps of which are as follows: Step S1001: the sender generates an HD wallet name card through the HD wallet device and sends it to the receiver; Step S1002: the receiver trusts the HD wallet name card after verifying the HD wallet name card.

In Step S1001, the sender generates an HD wallet name card through the HD wallet device and sends it to the receiver.

Specifically, the sender sends an instruction of generating an HD wallet name card to the sender's HD wallet device through the sender's host computer, and the sender's HD wallet device responds to the instruction to generate an HD wallet name card and sends it to the sender's host computer which then sends the HD wallet name card to the receiver's host computer. Optionally, the sender's host computer saves the HD wallet name card after receiving the HD wallet name card generated by the HD wallet device, and then can directly send and use the HD wallet name card.

In Step S1002, the receiver trusts the HD wallet name card after verifying the HD wallet name card.

Specifically, the receiver's host computer verifies the HD wallet name card after receiving the name card. It shall be understood that the first trusted public key of the first trusted key preset by the HD wallet device is known; under the premise of the known first trusted public key and the first public key, the receiver's host computer can quickly verify the integrity and consistency of the HD wallet name card to ensure that the HD wallet name card is indeed generated by the HD wallet device comprising the wallet seed corresponding to the first address, without a modification by a third party. The specific method is as follows: the second signature information is verified with the first trusted public key, and the first signature information is verified with the first public key. In a trusted environment, such as a face-to-face communication or a telephone confirmation, the receiver confirms that the source of the HD wallet name card is trustworthy; the receiver can remember the wallet cover of the wallet name card in addition to the HD wallet name card, so that the HD wallet name card can be equated with the trusted relationship in memory when reused.

Further, the receiver can send a trust instruction to the receiver's HD wallet device through the host computer, and the receiver's HD wallet device trusts the HD wallet name card according to the instruction. The HD wallet device has a third key generated by the seed of the HD wallet according to a preset designated path, and the third key comprises a third private key, a third public key, and a third address. The specific method for the HD wallet device to trust the received HD wallet name card is to digitally sign the received HD wallet name card with the third private key to generate a trusted wallet name card.

It shall be understood that for the HD wallet device, the third key and the first key may be generated by the seed according to the same designated path, that is, for the seed of the same HD wallet device, the first key and the third key can be the same.

It shall be understood that the third key is only owned by the receiver's HD wallet device, and can only generate the trusted wallet name card by the receiver which is trusted by the receiver, so that any third party cannot forge and tamper with the trusted wallet name card.

Figure 8:
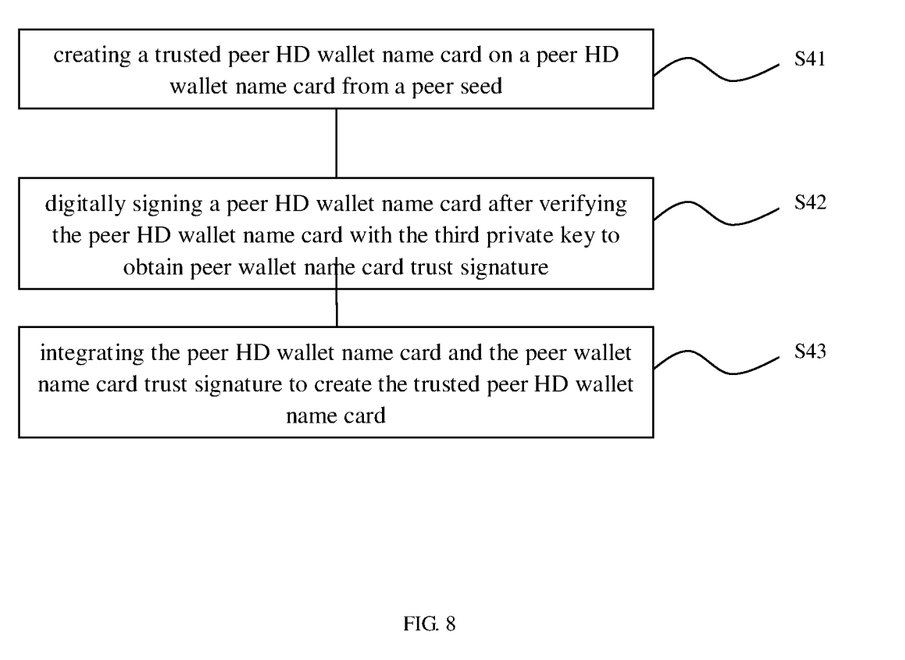
FIG. 8 is a schematic diagram of a method for generating an HD wallet name card according to one embodiment of the present invention.

In one embodiment, as shown in FIG. 8, the method for generating the HD wallet name card further comprises the following steps: Step S41, creating a trusted peer HD wallet name card on a peer HD wallet name card from a peer seed; Step 42, digitally signing a peer HD wallet name card after verifying the peer HD wallet name card with the third private key to obtain peer wallet name card trust signature; and Step 43, integrating the peer HD wallet name card and the peer wallet name card trust signature to create the trusted peer HD wallet name card.

The trusted wallet name card can be transmitted back to the host computer and saved by the host computer and the name system. The trusted wallet name card is verified with the signature of the trusted wallet address by using the third public key; therefore, the trusted relationship with the wallet name card is digitized, plus the receiver's memory of the wallet cover, it's greatly ensured that the trust of the receiver's wallet name card will not be deceived or tampered with.

The operating method further comprises the steps as follows: Step S1003: the sender generates the HD wallet trusted address through the HD wallet device and sends the trusted address to the receiver; Step S1004: the receiver trusts the HD wallet trusted address after verifying the HD wallet trusted address with the HD wallet name card. In Step S1003, the sender generates an HD wallet trusted address and sends it to the receiver.

Specifically, the sender sends an instruction of generating an HD wallet trusted address to the sender's HD wallet device through the sender's host computer, and the sender's HD wallet device responds to the instruction to generate an HD wallet trusted address and sends it to the sender's host computer which then sends the HD wallet trusted address to the receiver's host computer. Optionally, the sender's host computer saves the HD wallet trusted address after receiving the HD wallet trusted address generated by the HD wallet device.

In Step S1004, the receiver trusts the HD wallet trusted address after verifying the HD wallet trusted address with the HD wallet name card.

Specifically, the receiver's host computer verifies the HD wallet trusted address after receiving the trusted address; under the premise of the known first trusted public key and the first public key, the receiver's host computer can quickly verify the integrity and consistency of the HD wallet trusted address to ensure that the HD wallet trusted address is not modified by a third party. The fourth signature information is verified with the first trusted public key, and the third signature information is verified with the first public key. When a received HD wallet name card has the same first public key or the first addresses in the HD wallet trusted address, it is determined that the HD wallet trusted address comes from the seed of the HD wallet name card. Further, the received trusted address may be digitally signed with a third private key to generate a trusted wallet address indicating the trust to the trusted address.

Further, the sender may also put the transaction request into the HD wallet trusted address as a supplement and send the HD wallet trusted address to the receiver together. The receiver verifies the HD wallet trusted address and initiates the transaction according to the transaction request, and the trusted address may be saved, wherein the HD wallet trusted address including the transaction request plus the corresponding HD wallet name card may be taken as a part of the transaction proof.

Further, when the HD wallet device is used to sign the transaction which goes to the trusted address, the HD wallet firstly verifies the validity of the trusted address, and uses the first address of the trusted address to match all the first addresses saved in the trusted wallet name card of the HD wallet. When the trusted wallet name card is matched, it indicates that the transaction goes to the trusted wallet name card. Based on the technology and the above manner, the HD wallet device can indicate whether the transaction goes to a trusted wallet name card and gives the corresponding wallet name card information when confirming the transaction signature, thus to help the user identify trustworthy transactions from forged and tampered ones, thereby ensuring the security of the transaction.

In the above description, both the sender and the receiver use the HD wallet device in the present invention. In actual use, as the receiver, it is highly probable that the HD wallet device in the present invention is not used. Therefore, after receiving the HD wallet name card and the HD wallet trusted address, the receiver can verify the HD wallet name card and the HD wallet trusted address when the exposed corresponding public key is obtained. However, due to the lack of the HD wallet device, the trusted operation of the HD wallet name card and the HD wallet trusted address cannot be conducted.

Figure 7:
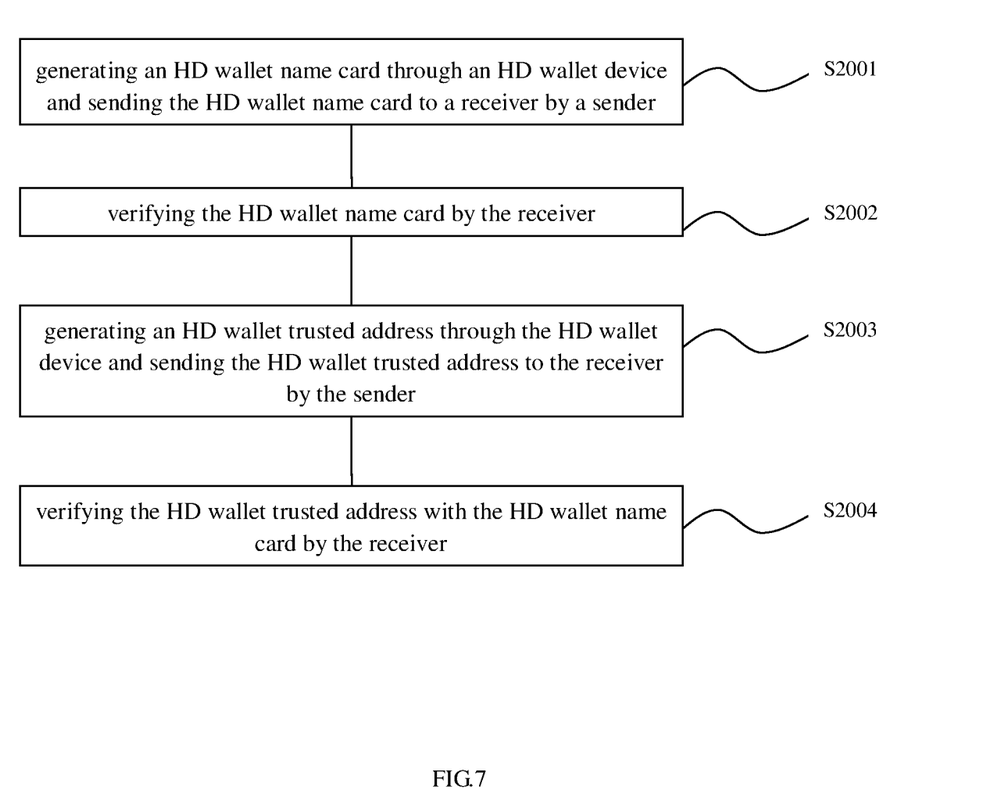
FIG. 7 is a schematic diagram of another operating method according to the present invention.

For a general receiver, as shown in FIG. 7, the operating method is as follows: Step S2001: the sender generates an HD wallet name card through the HD wallet device and sends it to the receiver; Step S2002: the receiver verifies the HD wallet name card.

Further, the operating method further comprises: Step S2003: the sender generates the HD wallet trusted address through the HD wallet device and sends the trusted address to the receiver; Step S2004: the receiver verifies the HD wallet trusted address with the HD wallet name card.

As described above, it is obvious that the difference from the foregoing operating method is that: as a general receiver, only the HD wallet name card and the HD wallet trusted address are verified.

The basic principles, main features and advantages of the present invention have been shown and described above. It should be understood by those skilled in the art that the above embodiments are not intended to limit the invention in any way, and the technical solutions obtained by means of equivalent substitution or equivalent transformation are all within the scope of the present invention.

What is claimed is:

1. A method for generating a hierarchical deterministic (HD) wallet name card, which is applied to an HD wallet device, wherein the HD wallet device has a preset first trusted key and a first key generated by a seed; the first trusted key comprises a first trusted private key and a first trusted public key; the first key comprises a first private key, a first public key, and a first address; and the HD wallet name card is generated through the following steps: digitally signing first user information with the first private key to obtain first signature information; digitally signing second user information with the first trusted private key to obtain second signature information; digitally signing third user information with the first private key to obtain third signature information; digitally signing fourth user information with the first trusted private key to obtain fourth signature information; and generating the HD wallet name card by integrating the first user information, the second user information, the first signature information, the second signature information, the third user information, the fourth user information, the third signature information, and the fourth signature information; wherein the first user data comprises: a wallet cover for visually displaying information of the HD wallet name card; and biological data for representing user's biological information; and wherein the HD wallet device further has a preset second trusted key, and the second trusted key comprises a second trusted private key; and the wallet cover is generated through the following steps: generating a name image comprising the wallet name with the wallet name; generating a first short code ID with the first address and the second trusted private key; generating a second short code ID with the wallet name, the first address and the second trusted private key; and generating the wallet cover by integrating the name image, the second short code ID and the first short code ID.

2. The method for generating the HD wallet name card according to claim 1, wherein a specific step of digitally signing the first user information with the first private key to obtain the first signature information is: digitally signing a wallet name card, first user data and the first public key with the first private key to obtain the first signature information.

3. The method for generating the HD wallet name card according to claim 1, wherein a specific step of digitally signing the first user information with the first private key to obtain the first signature information is: digitally signing a wallet name card, first user data, the first public key and the first address with the first private key to obtain the first signature information.

4. The method for generating the HD wallet name card according to claim 1, wherein a specific step of digitally signing the first user information with the first private key to obtain the first signature information is: digitally signing a wallet name, first user data, the first public key, the first address and the second signature information with the first trusted key to obtain the first signature information.

5. The method for generating the HD wallet name card according to claim 1, wherein a specific step of digitally signing the second user information with the first trusted private key to obtain the second signature information is: digitally signing a wallet name, first user data and the first public key with the first trusted private key to obtain the second signature information.

6. The method for generating the HD wallet name card according to claim 1, wherein a specific step of digitally signing the second user information with the first trusted private key to obtain the second signature information is: digitally signing a wallet name, first user data, the first public key and the first address with the first trusted private key to obtain the second signature information.

7. The method for generating the HD wallet name card according to claim 1, wherein a specific step of digitally signing the second user information with the first trusted private key to obtain the second signature information is: digitally signing a wallet name, first user data, the first public key, the first address and the first signature information with the first trusted private key to obtain the second signature information.

8. The method for generating the HD wallet name card according to claim 1, wherein the H D wallet device further has a third key generated by the seed, the third key comprises a third private key, a third public key, and a third address; and the method for generating the HD wallet name card further comprises: creating a trusted peer HD wallet name card on a peer HD wallet name card from a peer seed; digitally signing a peer HD wallet name card after verifying the peer HD wallet name card with the third private key to obtain peer wallet name card trust signature; and integrating the peer HD wallet name card and the peer wallet name card trust signature to create the trusted peer HD wallet name card.

9. A method for generating an HD wallet trusted address, which is applied to an HD wallet device, wherein the HD wallet device comprises a first key, a second key, and a preset first trusted key; the first key comprises a first private key, a first public key, and a first address; the second key comprises a second private key, a second public key, and a second address; the first t rusted key comprises a first trusted private key and a first trusted public key; and the HD wallet name card is generated through the following steps: digitally signing first user information with the first private key to obtain first signature information; digitally signing second user information with the first trusted private key to obtain second signature information; digitally signing third user information with the first private key to obtain third signature information; digitally signing fourth user information with the first trusted private key to obtain fourth signature information; and generating the HD wallet trusted address by integrating the first user information, the second user information, the first signature information, the second signature information, the third user information, the fourth user information, the third signature information, and the fourth signature information; wherein the first user data comprises: a wallet cover for visually displaying information of the HD wallet name card; and biological data for representing user's biological information; and wherein the HD wallet device further has a preset second trusted key, and the second trusted key comprises a second trusted private key; and the wallet cover is generated through the following steps: generating a name image comprising the wallet name with the wallet name; generating a first short code ID with the first address and the second trusted private key; generating a second short code ID with the wallet name, the first address and the second trusted private key; and generating the wallet cover by integrating the name image, the second short code ID and the first short code ID.

10. The method for generating the HD wallet trusted address according to claim 9, further comprising digitally signing fifth user information with the second private key to obtain fifth signature information; and generating the HD wallet trusted address by integrating the third user information, the fourth user information, the fifth user information, the third signature information, the fourth signature information, and the fifth signature information.

11. The method for generating the HD wallet trusted address according to claim 9, wherein a specific step of digitally signing the third user information with the first private key to obtain the third signature information is: digitally signing the first public key and the second address with the first private key to obtain the third signature information.

12. The method for generating the HD wallet trusted address according to claim 9, wherein a specific step of digitally signing the third user information with the first private key to obtain the third signature information is: digitally signing the first public key, the first address and the second address with the first private key to obtain the third signature information.

13. The method for generating the HD wallet trusted address according to claim 9, wherein a specific step of digitally signing the third user information with the first private key to obtain the third signature information is: digitally signing the first public key, the first address, the second address and second user data with the first private key to obtain the third signature information.

14. The method for generating the HD wallet trusted address according to claim 9, wherein a specific step of digitally signing the third user information with the first private key to obtain the third signature information is: digitally signing the first public key, the first address, the second address, second user data and the fourth signature information with the first trusted private key to obtain the third signature information.

15. The method for generating the HD wallet trusted address according to claim 9, wherein a specific step of digitally signing the fourth user information with the first trusted private key to obtain the fourth signature information is: digitally signing the first public key and the second address with the first trusted private key to obtain the fourth signature information.

16. The method for generating the HD wallet trusted address according to claim 9, wherein a specific step of digitally signing the fourth user information with the first trusted private key to obtain the fourth signature information is: digitally signing the first public key, the first address and the second address with the first trusted private key to obtain the fourth signature information.

17. The method for generating the HD wallet trusted address according to claim 9, wherein a specific step of digitally signing the fourth user information with the first trusted private key to obtain the fourth signature information is: digitally signing the first public key, the first address, the second address and second user data with the first trusted private key to obtain the fourth signature information.

18. The method for generating the HD wallet trusted address according to claim 9, wherein a specific step of digitally signing the fourth user information with the first trusted private key to obtain the fourth signature information is: digitally signing the first public key, the first address, the second address, second user data and the third signature information with the first trusted private key to obtain the fourth signature information.

19. The method for generating the HD wallet trusted address according to claim 9, wherein all the H D wallet trusted addresses generated from a seed have integral and consistent belonging connection to the HD wallet name card of the seed; the HD wallet trusted address is verified with the first trusted public key and the first public key to prove the address generated from the seed with the first address, and the HD wallet trusted address is integral and consistent; the H D wallet name card is verified with the first trusted public key and the first public key to prove the HD wallet name card from the seed with the first address and the HD wallet name card is integral and consistent; and the HD wallet trusted address belongs to the HD wallet name card with the same first address, the belonging connection is integral and consistent then.

* * * * *